Feb. 4, 1936.  J. G. ALTHER  2,029,294
HEATING OF FLUIDS
Filed July 25, 1934  2 Sheets-Sheet 1

INVENTOR
JOSEPH G. ALTHER
BY
ATTORNEY

Patented Feb. 4, 1936

2,029,294

UNITED STATES PATENT OFFICE 2,029,294

HEATING OF FLUIDS

Joseph G. Alther, Chicago, Ill., assignor to Universal Oil Products Company, Chicago, Ill., a corporation of Delaware Application July 25, 1934, Serial No. 736,821

22 Claims. (Cl. 122—356)

This invention refers to any improved method and means for heating fluids, particularly adapted to the heating of hydrocarbon oils to the high temperatures required for their pyrolytic conversion, with provisions for varying the heating conditions about different portions of the fluid conduit within the furnace through which the oil is passed so as to obtain the desired conditions of heat treatment for any type of oil. This application is a continuation-in-part of my copending application Serial No. 660,659, filed March 14, 1933, as a division of application Serial No. 592,972, filed February 15, 1932.

I have previously disclosed an improved type of furnace wherein heat is supplied by radiation from materials undergoing combustion and the hot refractory walls of the furnace to opposite sides of each tubular member comprising the fluid conduit through which the oil or other fluid undergoing heating is passed and have disclosed different arrangements of such fluid conduits in one or more compartments of a furnace as well as various specific flows for the stream or streams of fluid undergoing heating in the fluid conduit.

The present invention is particularly directed to one specific form of the type of furnace above mentioned employing a fluid conduit comprising two vertically parallel rows of horizontally disposed tubes, separate combustion zones being provided on opposite sides of the fluid conduit and the tubes in each row being arranged in staggered formation relative to the tubes in the other row so that each tube of the fluid conduit is subjected to heating from opposite sides by direct radiation from materials undergoing combustion in said combustion zones and from the hot refractory walls of the furnace. The present invention permits any desired flow of oil or other fluid to be heated through the fluid conduit and further provides methods and means for controling the heating conditions about different portions of the fluid conduit so as to provide the desired conditions of heat treatment for any type of oil or other fluid without changing the flow through the fluid conduit.

The features and advantages of the present invention may be best described with reference to the accompanying diagrammatic drawings comprising Figs. 1 and 2.

Figure 1:
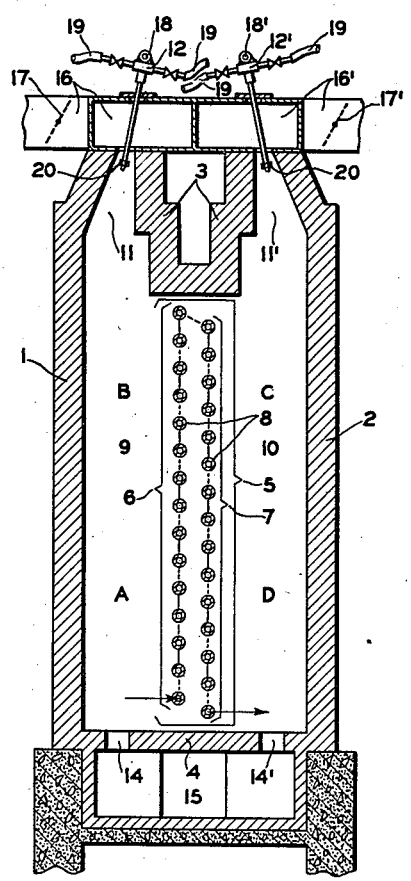
Figure 2:
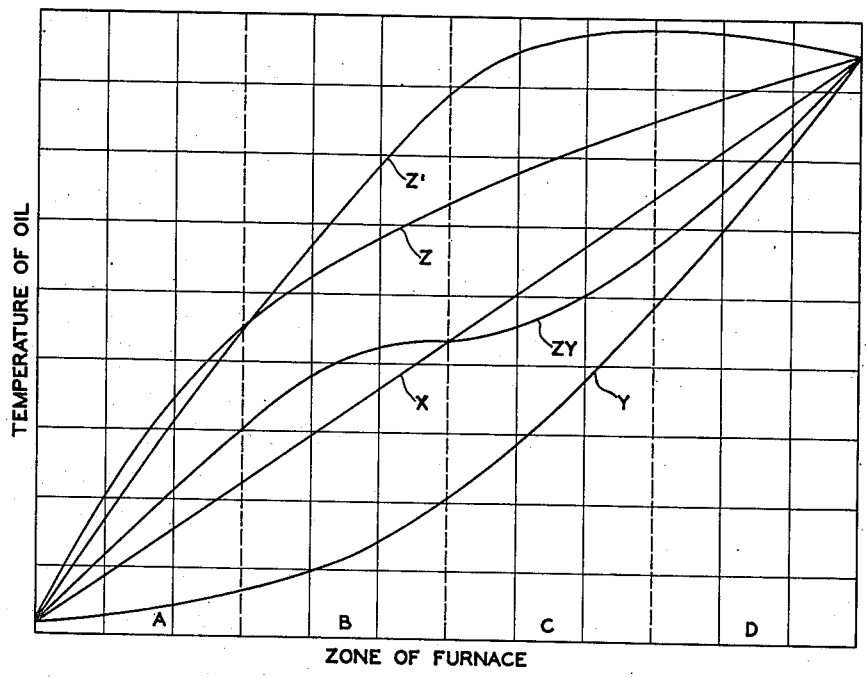

Fig. 1 is a cross-sectional elevation of one specific form of the furnace of the present invention, and Fig. 2 illustrates three representative types of heating curves and two modifications thereof which may be obtained in a furnace such as illustrated in Fig. 1 by means of the provisions of the present invention.

Referring now to Fig. 1, the main furnace structure comprises side walls 1 and 2, a roof 3, a floor 4 and end walls which are not shown in the particular view of the furnace here illustrated. A fluid conduit 5 comprising two vertically parallel rows 6 and 7 of horizontal tubes 8 is located centrally between side walls 1 and 2 of the furnace. The tubes extend between the end walls of the furnace and preferably adjacent tubes in each row are connected at their ends in series by means of suitable return bends located outside the heating zone and not here illustrated.

A combustion and heating zone 9 is located on one side of the fluid conduit between row 6 and wall 1 and a similar combustion and heating zone 10 is located on the other side of the fluid conduit between row 7 and wall 2. Each of the combustion and heating zones 9 and 10 are supplied with a combustible fuel-air mixture through firing ports or slots 11 and 11' located within the roof of the furnace. The combustion gases pass from each of the combustion and heating zones through suitable openings 14 and 14' provided in the floor of the furnace, preferably adjacent side walls 1 and 2, respectively, to flue 15 from which they may pass to a suitable stack (not shown).

Fuel of any suitable type is supplied to each of the combustion zones 9 and 10 by means of a plurality of suitable burners 12 and 12', respectively, the burners for each zone preferably being arranged in a row parallel to the adjacent side wall of the furnace. Air and/or steam for atomization of the fuel is supplied through the burners. The air required for combustion as well as excess air may be supplied to the combustion zones 9 and 10 through ducts 16 and 16', respectively, regulated by the respective dampers 17 and 17'. The total quantity of air and fuel supplied to each combustion zone as well as the relative proportions of fuel and air supplied to each zone are independently controlled so as to independently control the average heating conditions on opposite sides of the fluid conduit and so as to independently control the characteristics of the flame in each combustion zone. The present invention further provides for independently adjusting the angular position of each row of burners with relation to side walls 1 and 2 of the furnace so as to independently control the point of impingement of the materials undergoing combustion against each of the side walls. This may be accomplished in any desired manner and in the particular case here illustrated the two rows of burners 12 and 12' are mounted at the top upon suitable rods 18 and 18', respectively, which rods are movably mounted between suitable brackets (not shown), so that the burners in each row may be moved in unison, but independent of the burners in the other row, through the arc of a circle and burner ports 11 and 11' are tapered, as illustrated, so as to accommodate any desired adjustment in the angular position of the burners. Flexible tubing such as indicated, for example, at 19 may be provided to connect the fuel and air or steam lines to each burner with suitable headers, (not shown) so that the angular position of the burners may be adjusted without disconnecting them from the supply lines. Preferably, adjustable or interchangeable tips or jets 20 are provided on each burner in order to permit regulation of the velocity of the materials leaving the burners so as to control the length of the flames in each combustion zone independent of the volume of materials passing through the burners.

Thus, aside from the independent control exerted over the average heating conditions on opposite sides of the fluid conduit, by means of independently controlling the volume of combustible materials supplied to each combustion and heating zone, the heating conditions about the fluid conduit in different portions of each combustion and heating zone may be independently regulated to suit requirements by independently controlling the relative proportions of fuel and air supplied to each combustion and heating zone, by independently adjusting the point of impact of the combustion gases against the side walls of the furnace and by independently controlling the velocity of the materials leaving the burners.

The total radiant heat imparted to the fluid conduit is obtained by radiation from the flames, radiation from the hot combustion gases and radiation from the walls of the furnace. The intensity of radiation from each of these sources is a function of the temperature difference between the source and the temperature of the conduit. For example, when a short luminous flame (which is an intensely hot flame) is employed in either combustion and heating zone, the upper portion of the fluid conduit (i. e. that portion adjacent the flame) is subjected to radiation from high temperature sources and will absorb heat at a relatively high rate. Obviously, with a given total amount of heat generated in the combustion zone the high rate of heating resulting from the use of a short luminous flame in the upper portion of the combustion zone will leave a smaller amount of heat available in the combustion gases for absorption by fluid conduit in the lower portion of the combustion zone than when a lower rate of heating is employed in its upper portion. Therefore, even if the sources of heat were of the same character in the upper and lower portions of the combustion zone the lower portion of the fluid conduit would be subjected to much lower rates of heating than those prevailing in the upper portion when a short luminous flame is employed. However, when the lower portion of the fluid conduit is subjected to radiation only from non-luminous combustion gases and from the walls of the furnace the difference in the rates of heating about the upper and lower portions of the fluid conduit is even more pronounced.

On the other hand, by supplying a relatively large amount of excess air to the combustion zone with the fuel, so that the products of combustion in the upper portion of the combustion zone are of a substantially non-luminous character, the rate of heating about the upper portion of the fluid conduit may be decreased as compared with that obtained when employing the same amount of fuel and a smaller quantity of air. Furthermore, by pointing the burners toward the side wall of the furnace in such a manner that the materials undergoing combustion impinge against the side wall of the furnace at about its mid-point, so that a pronounced washing of the lower portion of the wall by the combustion gases is obtained, the temperature of this source of heat (the wall) will be greatly increased as compared with the wall temperature in the upper portion of the combustion zone, due to appreciable heating of the lower portion of the wall by convection from the hot gases as well as by radiation, while the upper portion of the wall is heated substantially only by radiation. Although the temperature of the combustion gases in the lower portion of the combustion zone is less than that in the upper portion of the combustion zone the greatly increased temperature of the wall in this zone will more than compensate for the decreased temperature of the gases and a greater total amount of heat will be imparted to the fluid conduit in the lower portion of the combustion zone than in the upper portion.

By employing a relatively high jet velocity from the burners and a relatively small amount of excess air a long luminous flame extending substantially from the burner ports to the floor of the furnace may be obtained in either or both combustion zones and in this manner substantially uniform rates of heating may be obtained from top to bottom of the tube bank, particularly when the lower portion of the side wall of the furnace is washed by the combustion gases to a greater extent than the upper portion.

According to the best present methods for calculating the heat input to tube surfaces, arranged as illustrated in the drawing and above described, the tube surfaces in row 6, for example, exposed to radiation from the materials undergoing combustion in zone 9 and the hot refractory walls on this side of the furnace receive approximately 66% of the total radiant heat supplied from these sources to both rows 6 and 7 while the surfaces of the tubes in row 7 facing zone 9 of the furnace receive approximately 23%. On the other hand, the surface of the tubes in row 7 facing zone 10 of the furnace receive approximately 66% of the total radiant heat supplied to both rows from the materials undergoing combustion in zone 10 and the hot refractory walls on this side of the furnace while the surface of the tubes in row 6 facing zone 10 receive approximately 23%. It is therefore apparent that the heat absorbed by row 6 is dominated by the intensity of radiant heat available from wall 1 and the materials undergoing combustion in combustion and heating zone 9 while the heat absorbed by row 7 is dominated by the intensity of radiant heat available from wall 2 and the materials undergoing combustion in combustion and heating zone 10. The total heat supplied to the tubes of row 6 may, therefore, be increased as compared with that supplied to row 7 by firing combustion zone 9 harder than combustion zone 10 with only a relatively small increase in the total heat supplied to the tubes of row 7, since this increases the major component of the total heat input into row 6 but only the minor component of the total heat supplied to row 7. Similarly, the total heat supplied to the tubes of row 7 may be increased by firing combustion zone 10 harder than combustion zone 9 with only a small increase in the total heat supplied to the tubes of row 6.

It is apparent from the foregoing that the combustion and heating zones of the furnace may, for the sake of illustration, be divided into four zones designated in the drawings as A, B, C and D, comprising, respectively, the lower portion of zone 9, the upper portion of zone 9, the upper portion of zone 10 and the lower portion of zone 10 and that the heating conditions prevailing in each zone may be regulated to suit requirements so as to obtain, within suitable limits, any desired heating conditions in each of four different portions of the fluid conduit comprising the section adjacent the respective heating zones A, B, C and D. In this manner any desired type of heating curve may be obtained to suit the requirements of the particular oil undergoing treatment.

Fig. 2 of the drawings illustrates three general types of heating curves and two modifications thereof which it may be desirable to employ for different oils, each of which may be obtained by utilizing the provisions of the present invention in a furnace of the character illustrated in Fig. 1.

A heating curve corresponding to each of the general types illustrated or to any desired combination or modification thereof may be obtained without altering the flow of oil through the fluid conduit and, furthermore, each type of heating curve may be obtained with any of several different flow arrangements through the fluid conduit.

Assuming, for example, a flow through the fluid conduit, such as indicated in Fig. 1 of the drawings by the lines connecting the various tubes (the direction of flow being indicated by the arrows) the location of zones A, B, C and D in Fig. 2 will correspond to zones A, B, C and D, respectively, in Fig. 1. The flow here indicated is upward through successive adjacent tubes in row 6 in series and then downward through successive adjacent tubes in row 7 in series, the dotted lines between adjacent tubes in each row indicating the connections on the far side of the furnace and the full lines between adjacent tubes indicating the connections on the near side of the furnace. The oil flows progressively through the tubes in zones A, B, C and D in the order named.

Referring to Fig. 2, curve X represents what is termed a straight-line heating curve and is the type obtained when the oil is subjected to a uniform rate of temperature increase during its passage through the entire length of the fluid conduit. This type of heating curve will give satisfactory results with relatively high boiling oils or oils of an intermediate nature such as heavy gas oil, fuel oil, crude petroleum, topped crude and the like.

In the heating of hydrocarbon oils, as the temperature of the oil increases the total heat required per unit rise in temperature also increases, due to vaporization of the oil and the greater proportion of latent heat required as vaporization progresses. Therefore, a straight-line heating curve can only be obtained by employing increasing rates of heating in the fluid conduit. When a flow such as indicated is employed through the fluid conduit of Fig. 1, progressively increasing rates of heating are employed in zones A, B, C and D of the furnace in order to obtain a straight-line heating curve such as curve X. This may be obtained, for example, by employing a relatively long flame of either luminous or non-luminous characteristics in combustion zone 9, by employing a relatively high jet velocity from burners 12 with either a relatively large or relatively small proportion of excess air supplied to combustion zone 9, depending upon whether a luminous or non-luminous flame is desired, and by adjusting the angular position of burners 12 relative to wall 1 so that at least the upper portion of this wall is washed with the hot combustion gases. A greater amount of fuel is supplied to combustion zone 10 than to combustion zone 9 and preferably a relatively long luminous flame is employed in zone 10 by utilizing a high jet velocity from burners 12' and by employing a relatively small amount of excess air in this zone. Also the angular position of burners 12' is adjusted so that the hot combustion gases wash the lower portion of wall 2 to a greater extent than the upper portion.

Curve Y of Fig. 2 illustrates the type of heating curve obtained with progressively increasing rates of temperature rise in the stream of oil flowing through the fluid conduit. This type of heating curve also can only be obtained with progressively increasing rates of heating from the inlet to the outlet of the fluid conduit. In this respect it is similar to the straight-line type of heating curve but requires more pronounced increasing rates of heat than those employed for obtaining a straight-line heating curve. With a flow such as indicated through the fluid conduit in Fig. 1 the type of heating curve illustrated by curve Y may be obtained by employing progressively more severe heating conditions in zones A, B, C and D of the furnace. This may be accomplished, for example, by employing a relatively short luminous flame in the upper portion of heating zone 9, by supplying a relatively small proportion of excess air in this zone and by employing relatively low jet velocities from burners 12, while employing a relatively long non-luminous flame in combustion zone 10 with a relatively high proportion of excess air in this zone and relatively high jet velocities from burners 12' and by washing the lower portion of wall 2 in combustion zone 10 to a greater extent than the upper portion. A greater quantity of fuel is supplied to combustion zone 10 than to combustion zone 9. When desired, the increased rates of heating in combustion zone B, as compared with those in zone A, may be further increased by adjusting the angular position of burners 12 so that the upper portion of wall 1 is washed with the hot combustion gases to a greater extent than its lower portion. This type of heating curve is particularly desirable in the conversion of relatively high boiling hydrocarbon oils such as fuel oil, heavy topped crudes and residual oils generally.

Curve Z in Fig. 2 illustrates a type of heating curve which is the reverse of heating curve Y and which is the result of employing progressively decreasing rates of temperature rise from the inlet to the outlet of the fluid conduit. This type of heating curve has been found particularly desirable for the conversion of relatively light oils such as light gas oils, kerosene distillate, pressure distillate bottoms and the like. A heating curve of this character is ordinarily obtained by employing progressively descreasing rates of heating from the inlet to the outlet of the fluid conduit but in some cases may be obtained by employing substantially uniform or even increasing rates of heating. Progressively decreasing rates of heating, such as will result in a heating curve of the type illustrated by curve Z, may be obtained when employing a flow such as indicated through the fluid conduit in Fig. 1 of the drawings by employing progressively less severe heating conditions in zones A, B, C and D of the furnace. This may be accomplished, for example, by employing a relatively long flame of either luminous or non-luminous characteristics in combustion zone 9 and by washing the lower portion of wall 1 with the hot combustion gases to a greater extent than its upper portion while employing a smaller amount of fuel in combustion zone 10 than in combustion zone 9 and employing a relatively short luminous flame in combustion zone 10.

Curve Z' of Fig. 2 represents a special heating curve of the same general type as curve Z but employing much less severe heating conditions in the final stages of the heat treatment than in the preceding stages so as to obtain what is termed a "soaking" effect. This type of heating is particularly advantageous as applied to the conversion or reforming of low boiling distillates such as gasoline, naphtha and the like. It will be noted with reference to the specific form of heating curve shown at Z' that the rate of temperature rise in zone C of the furnace decreases very abruptly and that the temperature of the oil reaches a maximum at about the junction of zone C and D of the furnace and gradually decreases from that point to the outlet from the heating coil. This drop in temperature is not essential, however, as a "soaking" effect can also be obtained with a substantially constant temperature or with increasing temperatures but not with increasing rates of temperature rise. A heating curve of the type illustrated by curve Z' may be obtained, when employing a flow such as indicated through the fluid conduit in Fig. 1, by employing conditions such as above described for obtaining curve Z except that a much smaller quantity of fuel is supplied to combustion zone 10 than to combustion zone 9.

Curve ZY in Fig. 2 is also a special case representing a combination of types Z and Y resulting from employing a materially decreased rate of heating at an intermediate point in the fluid conduit. This type of heating curve has been found particularly advantageous when converting oils which undergo substantially complete vaporization at an intermediate point in their heat treatment. It has been found that such oils are most susceptible to coking during the stage of heating wherein they undergo substantially complete vaporization and by decreasing the rate of heating in this zone the excessive production and accumulation of coke may be prevented. Heating conditions which give a heating curve of the type indicated by curve ZY may be obtained, when employing a flow such as indicated through the fluid conduit in Fig. 1, by employing a long non-luminous flame in combustion zone 9 with burners 12 adjusted so that the lower portion of wall 1 is maintained at a higher temperature than its upper portion, by causing the hot combustion gases to sweep the lower portion of the wall to a greater degree than its upper portion, and by duplicating these conditions in zone 10 of the furnace with a greater amount of fuel supplied to zone 10 than zone 9.

Other modifications and/or combinations of the three general types of heating curves illustrated in Fig. 2 may also be obtained by employing the features of the present invention and it will be apparent to those familiar with the art that all of the general types of heating curves illustrated, as well as any desired combination or modification thereof, may be obtained in accordance with the features of the present invention regardless of the particular flow arrangement for the oil through the fluid conduit. The invention is, therefore, not limited to the specific flow illustrated nor, in fact, to any one or any number of specific flows, one of the important features of the present invention being its wide flexibility and the ability to obtain any desired type of heating curve to suit the particular requirements of the oil undergoing treatment without changing the flow through the fluid conduit.

I claim as my invention:

1. In a process for the heating of fluids wherein fluid is passed in series through two adjacent parallel rows of tubes within a furnace and wherein each tube is subjected to heating by direct radiation from opposite sides, the improvement which comprises independently controlling the rate of heating in each row and in different portions of each row of tubes whereby to obtain the desired heating curve.

2. In a process for the heating of fluids wherein fluid is passed in series through two adjacent parallel rows of tubes within a furnace and wherein each tube is subjected to heating by direct radiation from opposite sides, the improvement which comprises independently controlling the rate of heating in each row of tubes whereby to obtain the desired heating curve.

3. In a process for the heating of fluids wherein fluid is passed through a conduit comprising two adjacent parallel rows of serially connected tubes within a furnace and wherein each tube is subjected to heating by direct radiation from opposite sides, the improvement which comprises independently controlling the rate of heating in different portions of the fluid conduit by independently controlling the firing conditions in the furnace on opposite sides of the fluid conduit.

4. In a furnace for the heating of fluids having a fluid conduit comprising two adjacent serially connected parallel rows of tubes and connected in series and having combustion zones on opposite sides of the fluid conduit, the combination with means for independently controlling the heating conditions in each combustion zone whereby to independently control the heating conditions on opposite sides of the fluid conduit.

5. In a furnace for the heating of fluids having a fluid conduit comprising two adjacent parallel serially connected rows of tubes connected in series and having combustion zones on opposite sides of the fluid conduit, the combination with means for independently controlling the intensity of heating in each combustion zone and independently controlling the relative amounts of fuel and air supplied to each combustion zone whereby to independently control the heating conditions in different linear portions of the fluid conduit.

6. A furnace for the heating of fluids having a fluid conduit comprising two adjacent, vertically parallel serially connected rows of horizontally disposed tubes connected in series, combustion zones located on opposite sides of the fluid conduit, means for supplying combustible fuel to each combustion zone whereby to supply heat to the fluid conduit from opposite sides by direct radiation, means for passing a continuous stream of fluid through the tubes in each row of the fluid conduit, and means for independently controlling the heating conditions in each combustion zone whereby to independently control the rate of heating in each of said rows.

7. A furnace for the heating of fluids having a fluid conduit comprising two adjacent, vertically parallel rows of horizontally disposed tubes, combustion zones located on opposite sides of the fluid conduit, means for supplying combustible fuel to each combustion zone whereby to supply heat to the fluid conduit from opposite sides by direct radiation, means for passing a continuous stream of fluid through the tubes in each row of the fluid conduit and through the two rows in series, and means for independently controlling the rate of heating at various points along the path of flow of the fluid through the conduit by independently controlling the amount of fuel supplied to each combustion zone and independently controlling the relative amounts of fuel and air supplied to each combustion zone.

8. In a furnace for the heating of fluids, fluid heating means comprising two adjacent, vertically parallel rows of horizontal tubes, combustion zones located on opposite sides of said heating means, and independently controlled angularly adjustable burner means for each of said combustion zones.

9. In a furnace for the heating of fluids, fluid heating means comprising two adjacent, vertically parallel rows of horizontal tubes, the tubes of one of said rows being in staggered relation with respect to the tubes of the other row, heat radiant walls directly facing and in unobstructed heat radiating relation to said heating means and forming combustion zones located on opposite sides of said heating means, and independently controlled burner means for each of said combustion zones.

10. In a furnace for the heating of fluids, the combination of a tube bank comprising two adjacent, parallel rows of heating tubes, the tubes in one of said rows being in staggered relation with respect to the tubes of the other row, and means for maintaining zones of radiant heat, including reflected radiant heat from walls of said furnace, on the opposite sides of said tube bank.

11. A furnace for heating fluids comprising a pair of spaced parallel and vertical heat radiant walls, a plurality of serially connected, horizontal heating tubes disposed in a common vertical plane between and in unobstructed heat radiating relation to said walls, the tubes being spaced from both said walls to form combustion zones on opposite sides of the vertical plane of the tubes, and independently controlled burner means for each of said combustion zones and adapted to project combustion products through the combustion zones in a direction generally transverse to the horizontal planes of the tubes.

12. A furnace for heating fluids comprising a pair of spaced parallel and vertical heat radiant walls, a tube bank between and in unobstructed heat radiating relation to said walls and comprising two adjacent, vertically parallel rows of horizontal tubes, the tubes of one of said rows being in staggered relation with respect to the tubes of the other row, said tube bank being spaced from both said walls to form combustion zones on opposite sides of the tube bank, and independently controlled burner means for each of the combustion zones and adapted to project combustion products through said zones in a direction generally transverse to the horizontal planes of the tubes.

13. A furnace for heating fluids comprising a pair of spaced parallel, heat radiant walls, a plurality of parallel heating tubes disposed in a common plane between and spaced from said walls, and means for impinging flame angularly against each of said walls on the side thereof facing the tubes.

14. A furnace for heating fluids comprising a pair of spaced parallel heat radiant walls, a plurality of parallel heating tubes disposed in a common plane between and spaced from said walls, independent burner means for impinging flame angularly against said walls on the sides thereof facing the tubes, and means permitting independent adjustment of the angular position of said burner means with respect to said walls whereby to vary the points of flame impingement against the walls.

15. A furnace for heating fluids comprising a pair of spaced parallel heat radiant walls, a plurality of parallel heating tubes disposed in a common plane between said walls, the tubes being spaced from both said walls to form combustion zones on opposite sides of the common plane of the tubes, and means for impinging flame angularly against said walls on the sides thereof facing the tubes and for projecting combustion products through said zones in a direction generally transverse to the tubes.

16. A furnace for heating fluids comprising a pair of spaced parallel and vertical heat radiant walls, a plurality of horizontal heating tubes disposed in a common vertical plane between and spaced from said walls, and means for projecting flame angularly against said walls on the sides thereof facing the tubes and downwardly into the spaces between the vertical plane of the tubes and said walls.

17. A furnace for heating fluids comprising a pair of spaced, parallel and vertical heat radiant walls, a tube bank between said walls and comprising two adjacent, vertically parallel rows of horizontal tubes, the tubes of one of said rows being in staggered relation with respect to the tubes of the other row, and means for projecting flame angularly against each of said walls on the side thereof facing the tube bank and downwardly between the tube bank and each of the walls.

18. A furnace for heating fluids comprising a pair of spaced, parallel and vertical heat radiant walls, a tube bank between said walls and comprising two adjacent, vertically parallel rows of horizontal tubes, the tubes of one of said rows being in staggered relation with respect to the tubes of the other row, and means for projecting flame angularly against each of said walls on the side thereof facing the tube bank and downwardly between the tube bank and each of the walls, the last named means comprising burners adjustably mounted to permit varying of the points of flame projecting against the walls.

19. A heating apparatus comprising a furnace, a plurality of spaced heating tubes arranged in a common plane in the furnace, a combustion zone on one side of the plane of the tubes, the tubes being spaced from a wall of the furnace to provide a combustion zone on the other side of the plane of the tubes, a plurality of burners at one end of the first-named combustion zone and adapted to project flame into the latter, additional burners at one end of and adapted to project flame into said second zone, the tubes being arranged to receive direct radiant heat on opposite sides thereof from the flames, and means for impinging combustion gases generated by said additional burners in said second zone against said wall.

20. A heating apparatus comprising a furnace, a plurality of spaced heating tubes arranged in a common plane in the furnace, a combustion zone on one side of the plane of the tubes, the tubes being spaced from a wall of the furnace to provide a combustion zone on the other side of the plane of the tubes, a plurality of burners at one end of the first-named combustion zone and adapted to project flame into the latter, additional burners at one end of said second zone and angularly arranged with respect to said wall to impinge flame upon the latter, the tubes being arranged to receive direct radiant heat on opposite sides thereof from the flames, and means for removing combustion gases from said zones.

21. A heating apparatus comprising a furnace a plurality of spaced, horizontal heating tubes superimposed one above the other in a vertical plane in the furnace, a combustion zone on one side of said vertical plane, the tubes being spaced from a wall of the furnace to provide a second combustion zone on the other side of said plane, a plurality of burners at one end of the first-named combustion zone and adapted to project flame into the latter in a direction substantially transverse to the horizontal planes of the tubes, additional burners at one end of said second zone and adapted to project flame thereinto in a direction generally transverse to the horizontal planes of the tubes, the tubes being arranged to receive direct radiant heat on opposite sides thereof from the flame, said additional burners in said second zone being so arranged with respect to said wall as to impinge flame upon the latter.

22. A heating apparatus comprising a furnace, a plurality of spaced, horizontal heating tubes superimposed one above the other in a vertical plane in the furnace, a combustion zone on one side of said vertical plane, the tubes being spaced from a wall of the furnace to provide a second combustion zone on the other side of said plane, a plurality of burners at one end of the first-named combustion zone and adapted to project flame into the latter in a direction substantially transverse to the horizontal planes of the tubes, additional burners at one end of said second zone and adapted to project flame thereinto in a direction generally transverse to the horizontal planes of the tubes, the tubes being arranged to receive direct radiant heat on opposite sides thereof from the flames and said additional burners being angularly disposed with respect to said wall to impinge flame upon the latter, and means for removing combustion gases from said zones.

JOSEPH G. ALTHER.